United States Patent Office 3,714,706
Patented Feb. 6, 1973

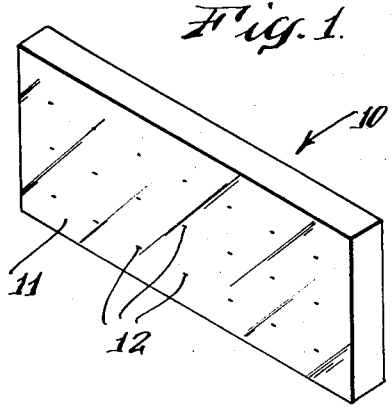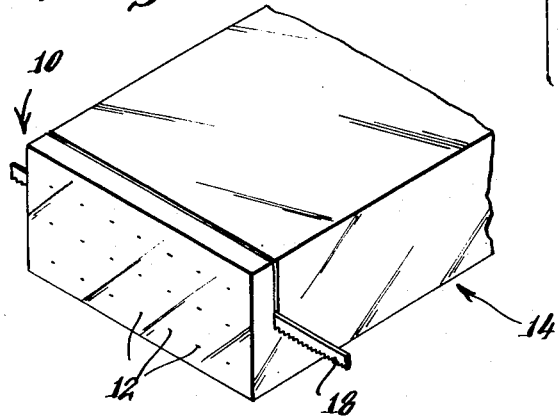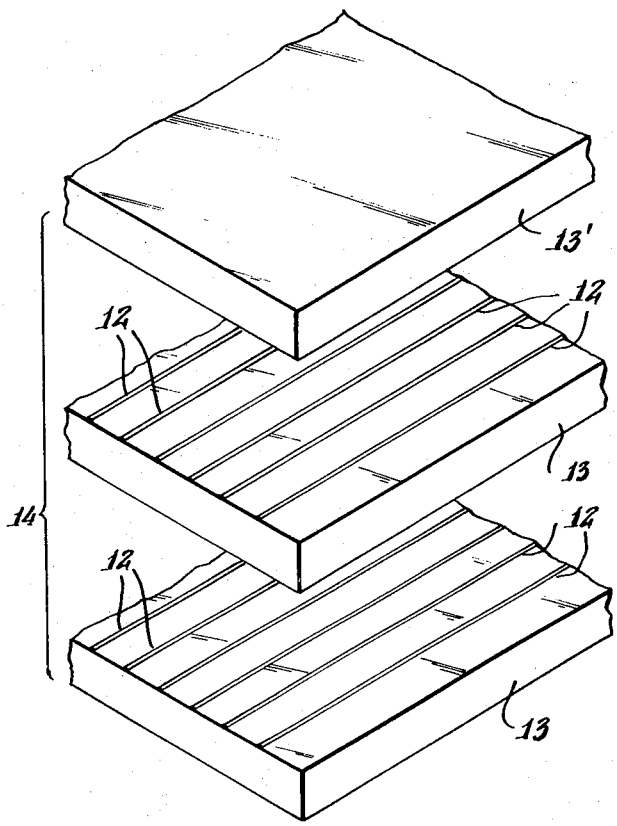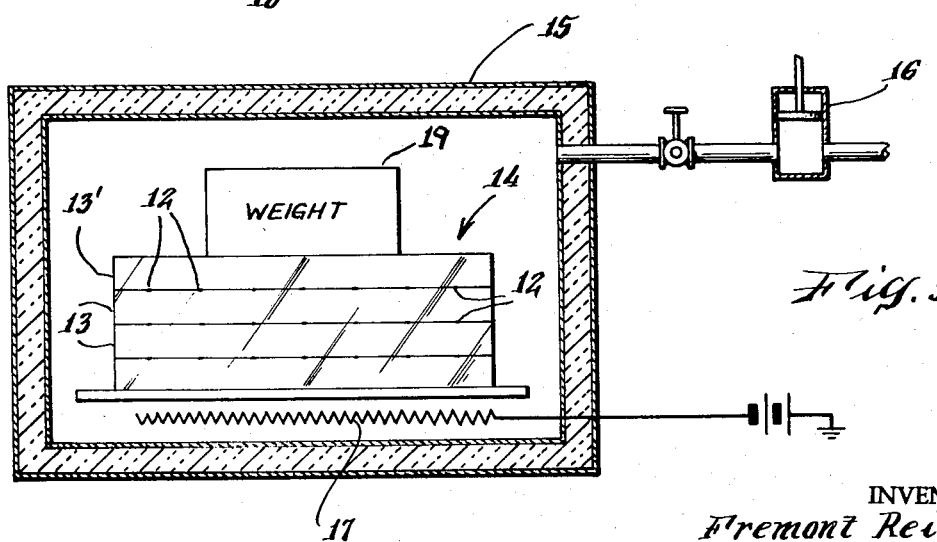

3,714,706
ARRAY OF CONDUCTORS FIXED THROUGH DIELECTRIC PLATE
Fremont Reizman, Wilton, and Robert B. McGraw, Jr., Orange, Conn., assignors to The Perkin-Elmer Corporation, Norwalk, Conn.
Filed Aug. 21, 1970, Ser. No. 65,768
Int. Cl. H01b 13/00; H05k 3/00
U.S. Cl. 29—624                                    1 Claim

ABSTRACT OF THE DISCLOSURE

Arrays of conductors accurately fixed in position relative to each other are made by laying stripes of conductive material, such as thin stripes of chromium, gold or platinum group metals, on a surface of each of a number of plates of dielectric material, such as glass, that softens when heated and that fuses to similar material at the softening point. The plates are stacked, placed under compression normal to their conductor bearing surfaces in a partial vacuum and heated to the softening point. The vacuum is then relieved and the heat turned off. After the stack cools below the softening point, the fused stack is sliced at an angle to the lengths of the conductors to provide plates having conductor arrays therethrough.

---

The present invention is a method of forming an electric circuit element in which a large number of separate electrical conductors between points in two spaced planes are fixed in an array in which their ends in one plane are in the same relative positions and have the same relative spacing with respect to each other as their opposite ends in the other plane. In particular, this is a method of providing a large number of small diameter conductors closely spaced in accurate alignment with each other through a plate of dielectric material, such as glass.

Circuit elements consisting of arrays of conductors between two planes as provided by this invention are adapted for picking up electric charges from selected points in a large, closely packed group in one plane and conducting them to corresponding points in another plane from which the points are more conveniently connected to other circuit elements. These elements are particularly adapted for use in membrane light modulators and in connection with cathode ray tube devices and the like, which transmit or reproduce selected signals picked up from an area in which a variety of possible signals may be available to be picked up.

It is known to make fixed arrays of conductors by arranging a plurality of glass insulated conductor wires in a bundle and heating it until the glass fuses. After the glass cools the block thus formed is sliced perpendicular to, or at an angle to, the conductors to provide plates having conductors through them from one side to the other. With arrays formed in this manner, however, the conductors are not accurately spaced in the finished plate. This is due in part to variations in the thickness of the glass insulation on the conductors, which is formed by dipping the conductors in molten glass. Also with this method, and particularly with very fine conductors, the conductors may cross and twist around themselves as they are bundled so that the positions of the ends of the conductors relative to each other at one side of a finished plate do not correspond with the relative positions of their opposite ends at the opposite side of the plate. Consequently, the conductors would have to be individually tested to locate their respective opposite ends in order to be sure of making the desired connections through them. This is impossible when the wires are extremely numerous and small.

It has also been proposed to form such a fixed array of conductors by threading conductors through appropriately arranged matching holes in opposite walls of a box-like mold, securing the outward ends of the conductors to the mold walls and then filling the mold with a liquid dielectric material, such as a synthetic resin plastic, which would subsequently set or harden to a solid block which could be sliced to produce plates with conductors through them. The dielectric material used must be a type which will set or harden without requiring or generating so much heat that the conductors would break or soften and sag into contact with one another. However, the difficulty and expense of threading and supporting many fine conductor wires through such a mold makes this method commercially impractical.

Objects of the present invention are to provide a simple effective method of making an array of conductors through a plate of dielectric material in which the many fine conductors can be concentrated in a small area with the conductors insulated from each other, in which the ends of the conductors at each opposite side of the plate are accurately positioned relative to each other and in which opposite ends of the conductors are in the same relative positions at one side of the plate as at the opposite side.

The foregoing objects are accomplished in accordance with this invention by laying conductors of the desired size on a number of plates of heat fusible dielectric material which are then stacked and fused into a solid block by heating. As the conductors are laid on the respective plates, they are spaced apart the desired lateral amount; the vertical spacing is determined by the thicknesses of the respective plates which are selected accordingly. The conductors are materials which will not break at the fusing temperature of the dielectric material, and which are not attacked by the latter material. Attack in this case means absorption, decomposition, or other transformation of the physical or chemical characteristics of the conductor as laid down which substantially destroys its ability to conduct an electric signal. The dielectric material is a material, such as glass, which will fuse to similar material at the softening point and which can be heated to the softening point without changing dimensions significantly. Chromium and gold are particularly satisfactory conductor materials for use with glass.

After cooling, the fused block is sliced crosswise of the conductors to provide plates having arrays of conductors through them. The thickness of the slices may be selected in accordance with the intended uses of the array elements thus provided, and the slices or plates may be ground and polished if necessary to further adjust their thicknesses, and surface configuration and smoothness, for particular uses.

Further objects, advantages and features of the method of the invention will be apparent from the following detailed description of the method with reference to the accompanying drawings in which:

FIG. 1 is an isometric view of a finished array of conductors fixed in a plate of dielectric material in accordance with this invention;

FIG. 2 is an exploded isometric view of a stack of plates, including plates having conductors laid on them, ready to be fused as a step in the subject method;

FIG. 3 is a schematic representation of apparatus adapted for fusing a stack of dielectric plates together and showing the stack of FIG. 2 in end elevation therein; and FIG. 4 is an isometric view of an array element, as in FIG. 1, showing it being sliced from a fused stack of plates.

Referring to the drawings, an array element 10 (FIG. 1) of this invention consists of a plate 11 of dielectric material having a plurality of electrical conductors 12 fixed through it so that their exposed ends at opposite sides of the plate are accurately spaced apart in a predetermined arrangement. For most purposes contemplated, the ends of the conductors will be equally spaced and will be parallel. Thus, the ends of the conductors will be in the same relative positions at opposite sides of the plate and it is not necessary to search with a test circuit to find where the opposite end of a particular conductor is at the opposite side of the plate. It will be appreciated, however, that the method of this invention is adapted for arranging conductors in various alignments for having their opposite ends exposed at predetermined positions at opposite sides of the dielectric plate and that the particular advantages of the invention is the ability to accurately fix the positions of even a great many closely spaced fine conductors through a dielectric plate.

As illustrated in FIG. 2, in accordance with the invention a number of conductors 12 are laid across the tops of each of a number of plates 13 of dielectric material and the plates 13 are piled into a stack 14 with a similar plate, 13', which does not have an conductors thereon, at the top of the stack to cover the conductors 12 on the plate 13 immediately below.

The plates 13 are a dielectric material, which may be easily softened by heat and which fuses to similar material at the softening point. The conductors 12 are materials which can be laid on the dielectric plates 13 in a predetermined arrangement as continuous filaments or stripes of the desired diameter and which, at the softening temperature of the dielectric material, will not break and will not be decomposed or otherwise attacked and rendered useless for conducting electric signals.

In the preferred form of this invention, in order to form an array consisting of many closely spaced fine conductors accurately fixed in a predetermined arrangement, glass is used as the dielectric material for the plates 13, 13' and the conductors are chromium or gold, or alternate layers of gold and chromium, which are suitably laid on the plates in a conventional manner by vapor deposition through a mask temporarily placed on the plates and having apertures defining the conductor paths to be laid on. Either chromium or gold are suitable alone, but in order to lay down a particularly fine conductor stripe having good electrical conductivity for its diameter, a layer of gold is deposited on a layer of chromium and is then overlaid with a cover layer of chromium. The chromium appears to disperse into the glass less than gold and a given amount of gold appears to remain in a narrower, more sharply defined stripe if laid on and covered by chromium.

The conductors 12 might also be formed by laying stripes of platinum or platinum group metals on glass in accordance with well known techniques such as by deposition from heat reducible decorating or coating compositions. They might also be applied by sputtering or silk screening.

With this method the conductors 12 are formed on the plates 13 to have precisely the diameter and lateral spacing desired in the finished array element 10. The vertical spacing is determined by the thicknesses of the plates 13 which do not change appreciably during the fusing since the glass remains self-supporting and dimensionally stable at the softening-fusing temperature and since the stripe conductors 12 are less than a thousandth of a millimeter thick when laid on in the manner described.

When the conductors 12 are formed, and the plates 13 and 13' are piled into a stack 14, the plates are fused by heating the stack to the softening point of the glass in a partial vacuum, for example a partial vacuum of one torr or less.

As illustrated in FIG. 3, the stack 14 is placed in a chamber 15 which is adapted to be evacuated by suitable means such as a vacuum pump indicated at 16, and to be heated by means such as an electric heater indicated at 17. A weight 19 is preferably placed on the top of the stack to apply some pressure to the softened plates, which, in addition to the pressure applied by their own weight, assists in squeezing air out from between the plates during the fusing process so that air bubbles are not trapped in the finished array element to impair the mechanical soundness of the slices cut from it. The weight, however, should not be so heavy that it would squeeze the plates and reduce their thickness when they are soft.

The chamber 15 is then evacuated to create a partial vacuum and heat is applied to bring the plates 13 and 13' up to their softening point so that they fuse together into a solid block. When the plates reach their softening point the vacuum is relieved and the heat is shut off. The relief of the vacuum, by introduction of air—or inert gas, if necessary to protect the wires—while the plates are still at their softening point, acts to reduce the volume of trapped bubbles.

The fused stack 14 is allowed to cool and is then sliced crosswise at an angle to the conductors 12 by suitable means, such as a diamond saw 18, into a number of array elements 10, as indicated in FIG. 4.

As an example of the method of this invention, an array element was made in accordance with the invention by depositing parallel chromium conductor stripes across glass plates. The glass plates were soda lime glass about one tenth of a millimeter thick. The chromium stripe conductors were less than a thousandth of a millimeter thick and were about a tenth of a millimeter wide and about a fifth of a millimeter apart. Two of the plates with conductors thereon were placed one on top of the other and another similar plate was placed on the upper one to cover the conductors thereon. A weight of about ¼ lb. was placed on top of the stack thus formed which was then placed in an evacuable oven. A partial vacuum of about 1 torr was created in the oven and heat was applied to heat the plates to their softening point—about 696° C. As soon as the plates reached their softening point at which they fused, the vacuum was relieved and the heat was shut-off. The stack was permitted to cool in air and then sliced at right angles to the conductors into a number of slices about one-half of a millimeter thick. The ends of the conductors were in corresponding positions at opposite sides of the slice and were the same dimensions and spaced apart the same amount as originally laid down. That is, their thickness, width and spacing in one direction were .001, 0.1, and 0.2 of a millimeter, respectively, and their spacing in the other direction was about one tenth of a millimeter apart, corresponding to the original thickness of the glass plates on which the conductors were formed. All the conductors were intact and showed resistances of a few ohms each.

It will be appreciated that certain modifications may be made in the steps of the methods and materials used without departing from the scope of the method defined by the appended claims. For example, while the invention is described above with specific reference to the use of glass dielectric material and chromium and gold conductors, heat fusable synthetic resin plastic materials and compatible conductor materials (i.e., not attacked by the dielectric material) could also be used.

What is claimed is:

1. A method of making an array of conductors fixed in accurately spaced apart predetermined relation to each other through a plate of dielectric material comprising:
providing a plurality of flat plates of a heat softenable glass such that the plates will fuse together at the softening temperature of the glass and such that the dimensions of the plates remain substantially unchanged by heating them to the softening point at which they fuse together;

placing flat continuous stripes of electrically conductive material across one flat surface of each plate, the stripes on each plate being spaced apart the predetermined amount desired for their spacing in one direction in the finished array, said conductive stripes being formed by placing stripes of chromium on the plates, placing stripes of gold over the chromium stripes and then placing stripes of chromium over the gold stripes, the combined thickness of each of these composite stripes being less than a thousanth of a millimeter;

stacking said plates so that the conductive stripes of each plate are in the predetermined alignment relative to the stripes on adjacent plates desired in the finished array, the thicknesses of the plates being selected so that the conductive stripes on each plate are spaced from the stripes on adjacent plates in the stack the amount desired for such spacing in the finished array;

placing the stack under compression substantially normal to the conductor-bearing surfaces, the compression being less than an amount that would change the dimensions of the plates at the softening temperature of the plate material;

heating the stack in a partial vacuum to the point at which the plates soften and fuse together without substantially changing dimensions;

then relieving the vacuum and shutting off the heat; and, after the stack has cooled below the softening point, slicing the fused stack at an angle to the lengths of the conductors to provide a number of plates each having conductors extending from one side through to the opposite side thereof.

References Cited

UNITED STATES PATENTS

| | | | |
|---|---|---|---|
| 761,204 | 5/1904 | Carpenter | 65—59 X |
| 2,266,349 | 12/1941 | Wempe | 29—604 UX |
| 2,526,704 | 10/1950 | Bair | 65—59 X |
| 2,933,634 | 5/1960 | Lederer | 65—59 X |
| 3,235,428 | 2/1966 | Naymik | 156—89 |
| 3,558,422 | 1/1971 | Hamilton | 65—59 |
| 2,547,950 | 4/1951 | Lee et al. | 29—604 UX |
| 3,546,776 | 12/1970 | Rodriguez | 29—626 |

CHARLES W. LANHAM, Primary Examiner

R. W. CHURCH, Assistant Examiner

U.S. Cl. X.R.

29—592, 604, 625, 629, 417; 65—59; 156—89